United States Patent

Wang et al.

[11] Patent Number: 5,686,541
[45] Date of Patent: Nov. 11, 1997

[54] MODIFICATION OF EPOXY RESINS WITH URETHANE PREPOLYMER FOR ELECTRONIC ENCAPSULATION

[75] Inventors: Chun-Shan Wang, Tainan; Tsung-Han Ho, Kao Hsiung, both of Taiwan

[73] Assignee: National Science Council, Taipei, Taiwan

[21] Appl. No.: 557,294

[22] Filed: Nov. 14, 1995

[51] Int. Cl.$^6$ .................... C08G 59/00; C08L 75/04
[52] U.S. Cl. .................... 525/528; 525/407; 525/438; 525/452; 525/453; 525/476; 525/504; 528/65; 528/66; 528/73; 528/76; 528/84; 528/85; 528/93
[58] Field of Search .................... 525/406, 407, 525/438, 452, 453, 476, 504, 423, 424, 528, 540; 528/21, 65, 66, 73, 76, 84, 85, 93, 94, 96, 368; 428/413, 423.1

[56] References Cited

U.S. PATENT DOCUMENTS

| | | | |
|---|---|---|---|
| 2,527,590 | 10/1950 | Speier, Jr. | 528/43 |
| 2,931,786 | 4/1960 | Clark et al. | 528/43 |
| 3,179,622 | 4/1965 | Haluska | 528/43 |
| 3,334,110 | 8/1967 | Schramm | 528/96 |
| 3,636,133 | 1/1972 | Marvin | 528/73 |
| 3,669,920 | 6/1972 | Heggis et al. | 528/74 |
| 3,923,747 | 12/1975 | Kolycheck | 528/28 |
| 3,979,365 | 9/1976 | Tanaka et al. | 528/73 |
| 4,520,144 | 5/1985 | Noren et al. | 525/528 |
| 4,762,900 | 8/1988 | Velasco et al. | 528/73 |
| 4,766,158 | 8/1988 | Fuzesi et al. | 521/110 |
| 4,766,183 | 8/1988 | Rizk et al. | 525/528 |
| 4,786,693 | 11/1988 | Hefner, Jr. | 528/73 |
| 4,902,767 | 2/1990 | Roitman et al. | 528/28 |
| 5,112,932 | 5/1992 | Koenig et al. | 528/51 |

OTHER PUBLICATIONS

Chun-Shan Wang, et al., "Toughening of Epoxy Resins by Modification with Dispersed Acrylate Rubber for Electronic Packaging," *J. Of Applied Polymer Science*, vol. 50, pp. 477–483 (1993).

Chung-Shan Wang, et al., "Low-Stress Encapsulants by Vinylsiloxane Modification," *J. Of Applied Polymer Science*, vol. 51, pp. 2047–2055 (1994).

Chun-Shan Wang, et al., "Modification of Epoxy Resins by Hydrosilation for Electronic Encapsulation Application," *J. Of Applied Polymer Science*, vol. 54, pp. 13–23 (1994).

Chun-Shan Wang, et al., "Aminosiloxane-modified epoxy resins as microelectronic encapsulants," *Die Angewandte Mackromolekulare Chemie* 224 (1995) 21–32 (Nr. 3857).

Primary Examiner—Randy Gulakowski
Attorney, Agent, or Firm—Hitt Chwang & Gaines

[57] ABSTRACT

A modified epoxy resin is prepared by mixing an isocyanate terminated urethane prepolymer with an epoxy resin in reactive conditions. The modified epoxy resin has a low internal stress when it is cured due to the flexible backbone of the urethane prepolymer incorporated therein, and has a high glass transition temperature due to a rigid oxazolidone structure formed via the epoxy ring opening with the isocyanate groups, and thus is useful as an electronic encapsulant.

5 Claims, No Drawings

MODIFICATION OF EPOXY RESINS WITH URETHANE PREPOLYMER FOR ELECTRONIC ENCAPSULATION

FIELD OF THE INVENTION

The present invention relates to a modified epoxy resin for electronic encapsulation, and in particular to a modified epoxy resin for electronic encapsulation which has a low internal stress and is prepared by mixing an isocyanate terminated urethane prepolymer with an epoxy resin in reactive conditions.

BACKGROUND OF THE INVENTION

Epoxy molding compounds (EMCs) have been widely used as encapsulation material for semiconductor devices in order to protect them from their surroundings and connect them to printed circuit boards. Because of its excellent heat, moisture, solvent, and chemical resistance superior electrical and mechanical properties, and good adhesion to many substrates, o-cresol-formaldehyde novolac epoxy (CNE) is the resin typically employed to encapsulate microelectronic devices. Upon cure, this multifunctional epoxy resin provides a densely cross-linked protective layer; however, it is relatively brittle.

The trend of electronics equipment is being miniaturized and becoming thinner, at the same time the scale of integration of large scale integrated circuits (LSICs) is continuing upward, forcing the design toward larger chips, finer patterns, and higher pin counts that are more susceptible to internal stress failure. The prevailing surface mount technology; (SMT) also generates thermal stress to devices. Internal stress may cause package cracking, passivation layer cracking, and aluminum pattern deformation, etc. Therefore, the development of a low-stress EMC is required for high-reliability semiconductor devices. The sources of internal stress resulted from the use of plastic encapsulants are considered to be shrinkage of the plastic upon curing process and thermal mismatch between the resin and the device. In the case of EMC encapsulation, the first source of shrinkage has been relatively minor, whereas the second one, which is caused by the difference in thermal expansion coefficients between resin and silicon chip, is the dominant factor. The internal stress on IC devices caused by the difference between thermal expansion coefficients is expressed in the following equation:

$$S = K \int (\alpha_r - \alpha_s) E_r dT$$

where S is the internal stress in the encapsulant; K, a constant; $\alpha_r$, the thermal expansion coefficient of the encapsulant; $\alpha_s$, the thermal expansion coefficient of the silicon chip, and $E_r$, the flexural modulus of the encapsulant. Therefore, it is necessary to reduce the thermal expansion coefficient and the flexural modulus of EMCs to reduce internal stress.

Reductions of internal stress by lowering of either the thermal expansion coefficient or the flexural modulus of the encapsulant have been reported. Increasing the amount of silica filler used in an encapsulant effectively lowers the thermal expansion coefficient; however, this approach not only increases the elastic modulus, but also increases the viscosity of the resin-composition, which resulting in poor moldability. Lowering the flexural modulus by modification with a rubber in a "sea-island" two-phase structure is considered to be more desirable than a one-phase structure in view of the thermal property needs (Nakamura, Y., Uenishi, S., Kunishi, T., Miki, K., Tabata, H., Kuwada, K., Suzuki, H., and Matsumoio, T. *IEEE 37th ECC Proceeding* 1987, 187). Traditional modifiers, which can reduce the elastic modulus of the cured epoxy resins, include reactive liquid rubber such as carboxyl-terminated butadiene-acryionitrile copolymer (CTBN) have been reported [Sultan, J. N. and McGarry, F. *J. J. Appl. Polym. Sci.* 1973, 13(1), 29; Pearson, R. A. and Yee, A. F. *J. Mater. Sci.* 1986, 21, 2475]. When CTBN modifiers are incorporated into resin compositions, a two-phase morphology consisting of relatively small rubber particles dispersed in a resin matrix is generated that toughens epoxy resins. However, phase separation depends upon the formulation, processing, and curing conditions. Incomplete phase separation can result in a significant lowering of the glass-transition temperature (Tg) [Kim, D. H. and Kin, S. C. J. *Appl. Polym. Sci.* 1991, 31(5), 289]. Moreover, their presence in epoxy molding compounds raises the thermal expansion coefficient of the resultant EMC. The relatively high Tg of butadiene-acrylonitrile copolymer also limits their low-temperature applications. Polysiloxanes are known for their excellent thermal and thermo-oxidative stability, moisture resistance, good electric properties, low stress, and lower Tg (−123° C.) values than conventional elastomers. Low-stress EMCs modified by vinyl or hydride terminated polydimethyl siloxanes reported by the present inventors have effectively, reduced the stress of cured epoxy resins by reducing flexural modulus and the coefficient of thermal expansion, however, the Tgs were slightly sacrificed [Ho, T. H. and Wang, C. S. *J. Appl. Polym. Sci.* 1994, 51, 2047; Ho, T. H. and Wang, C. S. *J. Appl. Polym. Sci.* 1994, 54, 13]. Therefore, 5 developing a material that not only reduces the stress of cured EMC but also increases Tg of the resultant EMC is a primary object of the present invention.

SUMMARY OF THE INVENTION

In order to accomplish the aforesaid object, an encapsulation composition for semiconductor devices prepared in accordance with the present invention comprises a modified epoxy resin having the following formula I:

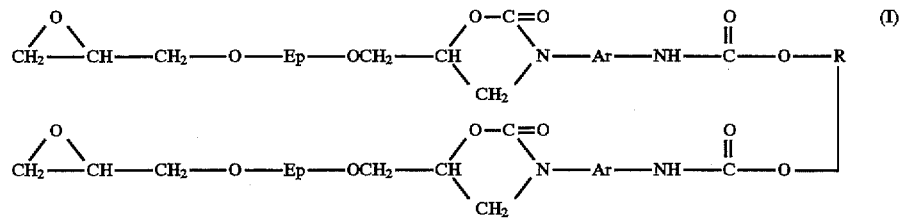

Wherein R is

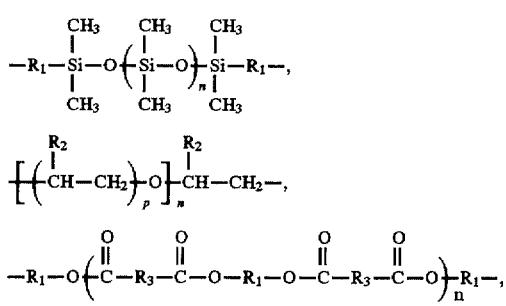

or

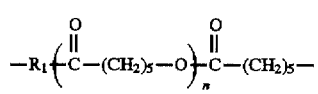

wherein $R_1$ is —$(CH_2)_m$—, m is an integer of 1–10;

$R_2$ is hydrogen or methyl;

$R_3$ is —$(CH_2)_q$—, q is an integer of 4–12;

n is an integer of 5–1000, and p is an integer of 1–3; Ar is phylene, tolylene, naphthylene,

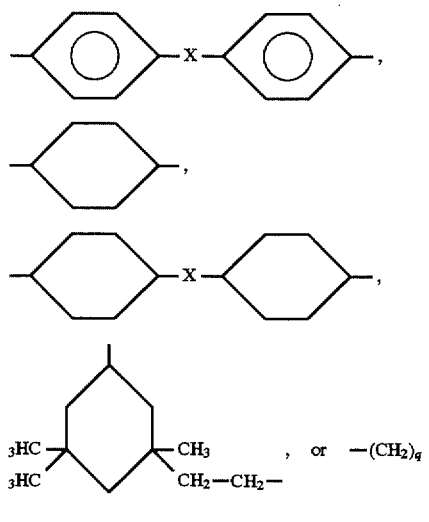

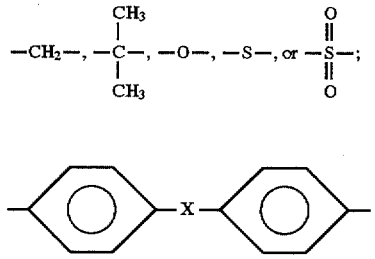

or a phenol-aldehyde novolac epoxy resin backbone having the following formula:

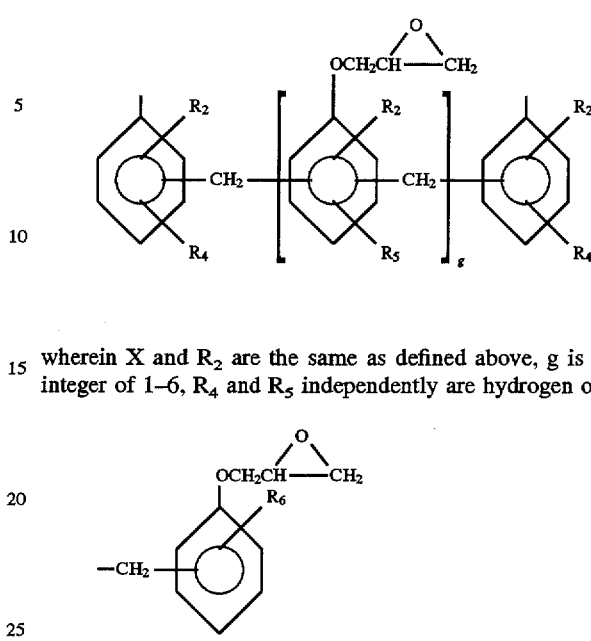

wherein X and $R_2$ are the same as defined above, g is an integer of 1–6, $R_4$ and $R_5$ independently are hydrogen or

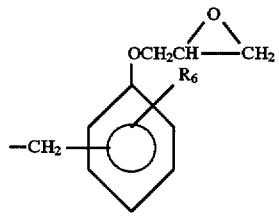

wherein $R_6$ is hydrogen or methyl.

Preferably, R of the modified epoxy resin I is

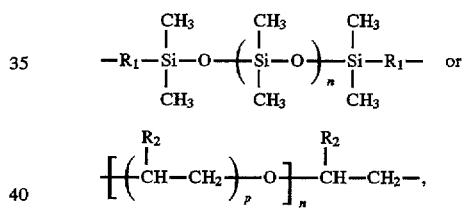

wherein n is an integer of 10–200, $R_2$ is hydrogen and p is 2. More preferably, R of the modified epoxy resin I is

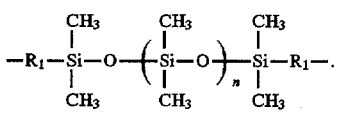

Preferably, Ar of the modified epoxy resin I is tolylene or

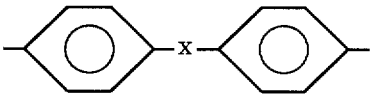

wherein X is —$CH_2$—.

Preferably, Ep of the modified epoxy resin I is a phenol-aldehyde novolac epoxy resin backbone having the following formula:

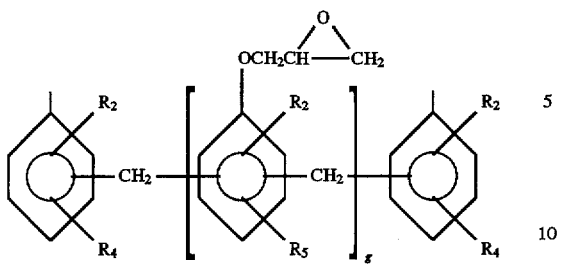

wherein $R_2$ is methyl, $R_4$ is hydrogen, g is an integer of 1–6, and $R_5$ is hydrogen or

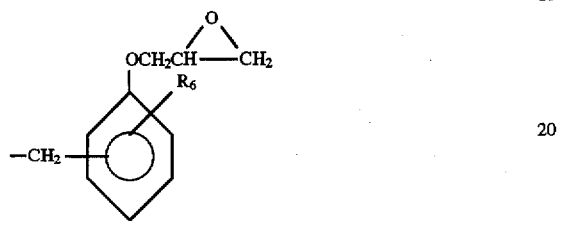

wherein $R_6$ is methyl.

DETAILED DESCRIPTION OF THE INVENTION

The present invention discloses a modified epoxy resin having the following formula I which can be used as encapsulation material for semiconductor devices:

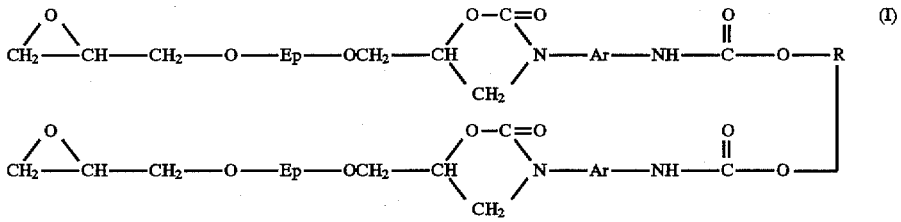

Wherein R is

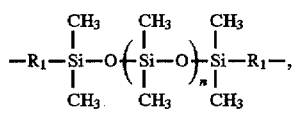

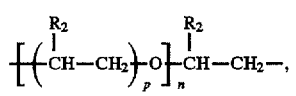

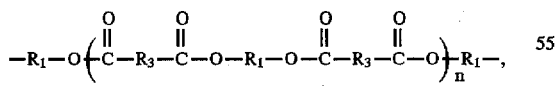

or

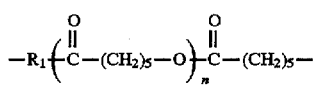

wherein
$R_1$ is —$(CH_2)_m$—, m is an integer of 1–10;
$R_2$ is hydrogen or methyl;
$R_3$ is —$(CH_2)_q$—, q is an integer of 4–12;

n is an integer of 5–1000, and p is an integer of 1–3; Ar is phylene, tolylene, naphthylene,

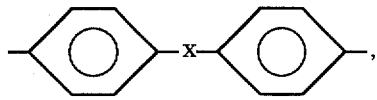

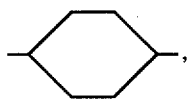

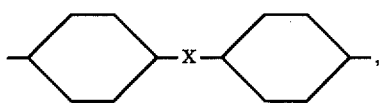

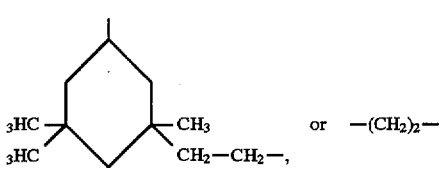

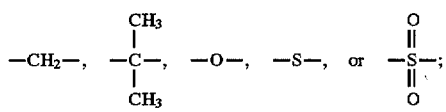

or a phenol-aldehyde novolac epoxy resin backbone having the following formula:

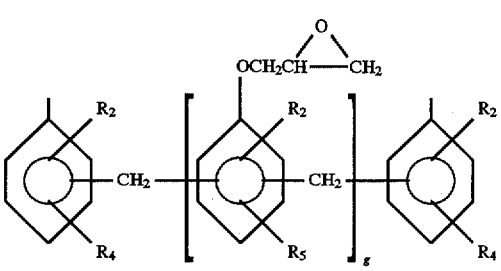

wherein X and $R_2$ are the same as defined above, g is an integer of 1–6, $R_4$ and $R_5$ independently are hydrogen or

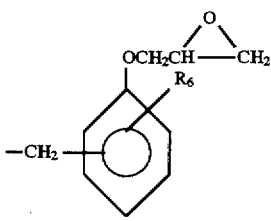

wherein $R_6$ is hydrogen or methyl.

A suitable process for preparing the modified epoxy resin I comprises reacting an isocyanate terminated urethane prepolymer having the following formula II with an epoxy resin having the following formula III or IV in the presence of a catalyst and in a co-solvent or molten state of said urethane prepolymer and said epoxy resin:

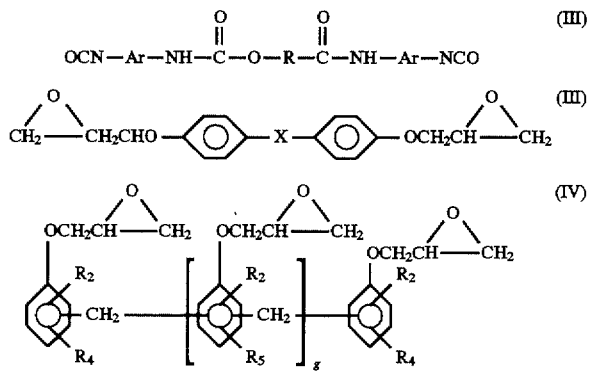

wherein R and Ar of the urethane prepolymer II; X of the epoxy resin III; and $R_2$, $R_4$ and R5 of the epoxy resin IV are the same as defined for the modified epoxy resin I. The reaction is carried out at a temperature of 120°–180° C., preferably 140°–160° C., and preferably in the presence of a catalyst. Examples of suitable catalysts for use in this ring opening reaction are 2-phenylimidazole, 2-methylimidazole, 1-methylimidazole, and 2-ethyl-4-methylimidazole. The resultant modified epoxy resin has an oxazolidone structure formed by the reaction of the terminal isocyanate groups of said urethane prepolymer II and the oxirane groups of said epoxy resin III or IV, which is confirmed by the appearance of an absorption peak at 1750 cm$^{-1}$ in an infrared spectrum.

The R group of said urethane prepolymer used to modify said epoxy resin III or IV effectively reduces the stress of the modified epoxy resin being cured by reducing flexural modulus and the coefficient of thermal expansion, while the glass transition temperature (Tg) is increased because of rigid oxazolidone structure formation. Electronic devices encapsulated with the present modified epoxy resin will exhibit an excellent resistance to the thermal shock cycling test and result in an extended device used life.

The isocyanate terminated urethane prepolymer for use in the present invention can be prepared by reacting a diol having a formula of HP—R—OH wherein R is the same as defined above with an excess amount of diisocyanate. Said diol has a weight average molecular weight of about 500 to 10,000. The diols useful in the present invention include (but not limited to) polydimethylsiloxane disilanol; polyether polyol such as polyethylene ether glycol, polypropylene ether glycol and polytetramethylene ether glycol; and polyester polyol includes those produced by reacting a dicarboxylic acid with an excess of an alkylene glycol such as adipic acid with ethylene or butane diol and by reacting a lactone with an excess of an alkylene glycol such as caprolactone and propylene glycol. Suitable diisocyanates for use in the present invention are aliphatic, cycloaliphatic, araliphatic and aromatic diisocyanates which are well known in the art. Specific examples include tolylene diisocyanate (TDI), 4,4'-diphenylmethane diisocyanate (MDI), naphthylene diisocyanate (NDI), hexamethylene diisocyanate, isophorone diisocyanate and hydrogenated 4,4'-diphenylmethane diisocyanate (HBMDI). Especially suitable are MDI, and 2,4- and 2,6-tolylene diisocyanates individually or together as their commercially available mixtures.

The synthesis of the isocyanate terminated urethane prepolymer is carried out with a molar ratio of said diol to said diisocyanate ranging from 1:1.5 to 1:2.5, preferably 1:2.0, at a temperature of 50°–100° C., preferably 65°–85° C., and to an extent until substantially all the hydroxyl groups of the diol are consumed. A catalyst, such as tin octoate, lead octoate and lead naphthoate, may be used to shorten the reaction time.

Suitable epoxy resins for use in the present invention can be any epoxy resin known in the art. Specific examples include bishpenol-A epoxy resin, phenol-formaldehyde novolac epoxy resin, and o-cresol-formaldehyde novolac (CNE) epoxy resin.

The invention will be further illustrated by the following examples in which parts and percentages are by weight unless otherwise indicated.

Materials

The control epoxy resin was o-cresol-formaldehyde novolac epoxy resin (CNE) [Quatrex3330, Dow Chemical Co., epoxy equivalent weight (EEW) 192]. A phenol-formaldehyde novolac resin was used as a curing agent with an average hydroxyl functionality of 6 and a hydroxyl equivalent weight of about 104 (Schenectady Chemical, HRJ-2210). Methylene bis(4-phenylisocyanate) (MDI) [Multrathane, Mobay Chemical] was distilled under reduced pressure (170° C. at 0.05 mmHg). Tolylenediisocyanate (TDI), technical grade (80/20 mixture of 2,4 and 2,6 isomers) was purchased from Fluka AG. Polytetramethylene ether glycol 9.0 (PTMG) [Polymer, Quaker Oats] was degassed under vacuum at 65° C. and mm Hg for 3 h to remove any absorbed water, then stored over type 4 A molecular sieves. Polypropylene ether glycol (PPG) and polyethylene ether glycol (PEG) [Naclai Tesque Inc., Kyoto, Japan] were degassed in the same manner as the PTMG. Polydimethyl-siloxane-α,ω-diol (PDMS-diol) with hydroxyl number 62 (XF-6001) and 112 (X-22–160AS), giving a calculated molecular weight (MW) of 1810 and 1002 respectively, were purchased from Shin-Etsu Chemical Co., Ltd., Japan. The polydiols used in the manufacture of polyurethane's, whose structure, MW, and designations are listed in Table 1. Stannous octoate was used as a catalyst in the syntheses of isocyanate terminated PDMS diols. 2-Phenylimidazole was used as a catalyst in epoxide-isocyanate reaction to form oxazolidone from the epoxide-isocyanate reaction. $Ph_3P$ was the triphenylphosphine that was used as a curing accelerator.

General procedure for the synthesis of urethane prepolymer
Preparation Examples 1–5 (Based on MDI):
Preparation Examples 1–3 (Urethane prepolymer):

To a flame-dried 500 mL four-neck round-bottom flask, equipped with a water cooled condenser capped with a $CaCl_2$ drying tube, a thermometer, $N_2$ inlet, a 150 mL addition funnel, and mechanical stirrer was charged 1.0 mole of MDI and heated to 85° C. To the MDI was added 0.5 mole of polyol (PEG, PPG, or PTMG) dropwise (i.e., NCO: OH=2:1) under a nitrogen atmosphere. The mixture was stirred and maintained at 5° C. until the absorption peak of OH group in infrared (IR) spectra had disappeared.

Preparation Examples 3–5 (PDMS-based urethane prepolymer):

The reaction flask was equipped in the same manner as mentioned above. The PDMS-based urethane prepolymer was synthesized by adding 0.5 mole of PDMS (S1810 or S1002) with 0.15 wt % stannous octoate dropwise to 1.0 mole of MDI over a period of 1 h while maintaining the reaction temperature at 650° C. under a nitrogen atmosphere. Completion of the reaction was confirmed by IR for the disappearance of the absorption peak of OH group.

were determined. The peak of tan δ was identified as the glass transition temperature (Tg) because of a large decrease in G' occurred at this point. Table 2 lists the dynamic viscoelastic properties.

It can be seen from the data shown in Table 2 that the cured epoxy resins prepared by using the present modified epoxy resins have a shear modulus lower than that of the Control 1 unmodified epoxy resin, and have a Tg which is comparable to or higher than that of the Control 1 unmodified epoxy resin. On the contrary, the Control 2 modified epoxy resin of the prior art after being cured has a Tg lower than that of the cured Control 1 unmodified epoxy resin.

TABLE 1

| Diol | Structure | Molecular weight (Designation) |
|---|---|---|
| polyethylene ether glycol | $HO-(-CH_2CH_2O-)_n-H$ | 2000 (PEG) |
| polypropylene ether glycol | $HO-[-C(CH_3)HCH_2O-]_n-H$ | 2000 (PPG) |
| poly(tetramethylene ether) glycol | $HO-(-CH_2CH_2CH_2CH_2O-)_n-H$ | 2000 (PTMG) |
| polydimethyl siloxane-α,ω-diol | $HO-(CH_2)_3-\underset{CH_3}{\overset{CH_3}{Si}}-O-\left(\underset{CH_3}{\overset{CH_3}{Si}}-O\right)_n-\underset{CH_3}{\overset{CH_3}{Si}}-(CH_2)_3-OH$ | 1810 (S1810) 1002 (S1002) |

Preparation Examples 6–10 (Based on TDI):

The procedures of Preparation Examples 1–5 were repeated except that TDI was used instead of MDI.

General procedure for the preparation of modified CNE Examples 1–10:

To a 1 L four-neck round-bottom flask, equipped with a $CaCl_2$ drying tube, heating mantle, $N_2$ inlet, stirrer, thermocouple, and temperature controller was added 400 g of o-cresol-formaldehyde novolac epoxy resin (CNE). The epoxy resin was heated to 150° C. and then vigorously stirred and dehydrated under vacuum (<10 mmHg) until the water content was less than 0.01% (measured by Karl Fischer). The reaction temperature was then raised to 160° C. and 350 ppm (based on CNE) of 2-phenylimidazole was added. To the stirring CNE was added 57.2 g of urethane or PDMS-based urethane prepolymer prepared in the Preparation Examples 1–10. The reaction temperature was held at 160° C. for 2 h. Completion of the epoxide-isocyanate reaction was confirmed by infrared spectroscopy for the disappearance of NCO group absorption. The resultant modified epoxy resin contained ca. 12.5 wt % dispersed rubber and had an EEW of ca. 230.

Example 11:

Each of the modified epoxy resins prepared in the Examples 1–10 was mixed with a stoichiometric amount of curing agent (HRJ-2210) and a small amount of $Ph_3P$ in a mill at moderate temperature to give a thermosettable epoxy resin powder. The resin powder was cured in a mold at temperature of 150° C. and 50 kB/cm² for a period of 1 h and then postcured at 180° C. for 2 h and 210° C. for 3 h to obtain a cured specimen (51 mm*12,7 mm*0.76 mm) for dynamic viscoelastic analysis.

Dynamic viscoelastic properties were performed on a Rheometrics RDA-II rheometer (Rheometrics, Inc., U.S.) between −150° and 250° C., with a heating rate of 5° or 2° C./step at a frequency of 1 Hz. The rectangular torsion mode was chosen and the dimensions of the specimen were 51 mm×12.7 mm×0.76 mm. The storage modulus G' and tan δ

TABLE 2

| Epoxy Resins | Tg of Specimen °C. | Shear Modulus 20° C., $10^9$ dyne/cm² | Tg of Rubber[c] °C. |
|---|---|---|---|
| Control 1[a] | 204 | 16.0 | — |
| Control 2[b] | 199 | 9.0 | −115 |
| Example 1 | 204 | 9.1 | −67 |
| Example 2 | 206 | 9.1 | −68 |
| Example 3 | 217 | 9.0 | −69 |
| Example 4 | 220 | 9.0 | −119 |
| Example 5 | 218 | 13.5 | −113 |
| Example 6 | 203 | 9.1 | −68 |
| Example 7 | 207 | 9.4 | −69 |
| Example 8 | 213 | 9.0 | −70 |
| Example 9 | 218 | 8.9 | −117 |
| Example 10 | 215 | 10.8 | −110 |

[a]blank test; specimen was prepared by using unmodified CNE.
[b]specimen was prepared by blending CNE Novolak with a silicone elastomer (code name: KMP590, Shin-Etsu Chemical Co., Ltd., Japan) in a weight ratio of CNE:silicone elastomer = 87.5:12.5.
[c]Tg of the urethane prepolymers prepared in the Preparation Examples 1–10 and the silicone elastomer KMP590.

Example 12:

Encapsulation Formulation

The Control 1 and Control 2 epoxy resins of Table 1 and the modified epoxy resins of Examples 1–10 were formulated into 12 electronic encapsulating formulations. The formulations were each cured at 175° C. for 4 h. The detail of encapsulating formulations are given in Table 3. The thermal mechanical properties of the cured encapsulating formulations were determined by the following tests.

TABLE 3

Typical Encapsulating Formulation

| Ingredients | Weight (%) |
|---|---|
| Cresol epoxy novolac | 17.5 |
| Phenolic hardener (HRJ-2210) | 9.1 |
| Brominated epoxy resin (Quatrex 6410, Dow Chemical) | 2.5 |
| Fused silica (GP-71, Harbison-Walker Co., U.S.) | 68.5 |
| Mold release (Hoechst Wax OP&E, Hoechst, Germany) | 0.4 |
| Carbon black | 0.4 |
| Silane coupling agent (DC Z-6040, Dow-Corning Corp.) | 0.4 |
| Antimony trioxide | 1.0 |
| Triphenylphosphine accelerator | 0.2 |

Procedure

1. B-Stage melt mix at 95° C. for approximately 7 min
2. Cool and grind to a uniform powder
3. Transfer molding of powder at 175° C. for 90 seconds
4. Postcure at 175° C. for 4 h Measurement and Testing Thermal Mechanical Analysis The coefficient of thermal expansion (CTE) was measured with a DuPont 943 thermal mechanical analyzer (TMA) in accordance with ASTM E831–86. A specimen 4-mm in length was used at a heating rate of 5° C./min. Normally, the thermal expansion increases with the increase in temperature and the CTEs were calculated from the slope. An abrupt change in slope of the expansion curve indicates a transition of the material from one state to another.

Flexural Properties

Flexural properties of cured resins were measured using a Shimadzu AGS-500 universal testing machine. Flexural strength and modulus were obtained at a crosshead speed of 2 mm/min according to ASTM D790–86. A three-point loading system was chosen and rectangular bar specimens, 80 mm×10 mm×4 mm, were molded directly by a transfer molding process.

Internal Stress

The internal stress on IC devices caused by the difference between thermal expansion coefficients is expressed in the following equation:

$$S = K \int_{T1}^{Tg} (a_r - a_s) E_r dT$$

where S is the internal stress in the encapsulant; K, a constant; $\alpha_r$, the thermal expansion coefficient of the encapsulant; $\alpha_s$, the thermal expansion coefficient of the silicon chip; $E_r$, the flexural modulus of the encapsulant; T1, room temperature, and Tg, the glass transition temperature of the encapsulant. The above equation can be simplified as $S=K^*\alpha_r E_r \Delta T$, in view of the fact that $\alpha_r$ is about 10 times larger than $\alpha_s$, $\alpha_s$, wherein $\Delta T$ is the temperature difference between room temperature and Tg of the encapsulant. The equation can be further simplified as $S=\alpha_r^* E_r$ because of $\Delta T$ is the same for all the tested IC devices.

Moisture Absorption

The moisture pick up was determined by placing pre-weighed 3 mm thick×50 mm diameter cured disks in boiling water for 100 h. The disks were removed and were cooled to ambient temperature and then wiped dry and weighed to determine any weight gain.

Thermal Shock Cycling Test

Thermal shock cycling test was carried out by the following procedure. The device used was a 14-pin LM 324 quad operational amplifier with a single passivation layer. The device was encapsulated with an encapsulation formulation by a transfer molding process and subjected to a thermal cycling test. A cycle consisted of −65° C.×15 min and 150° C.×15 min. The devices were inspected by an optical microscope for cracks after 250, 500, 750, 1000, 1500, 2000, 2500, 3000, 3500, 4000, and 4500 cycles. Any crack observed in the encapsulated device was counted as the failure of that device. The percentage of devices that failed (cracked), as a function of cycles, is plotted.

Results and Discussion

Table 4 shows the thermal mechanical properties. The CTE in the glassy state below the Tg was taken from 60° to 100° C. and the CTE above the Tg was taken from 200° to 240° C. For the CTE below Tg, all rubber modified encapsulants have approximately equal to or slightly lower CTE than the unmodified resin and this will result in a small difference in CTEs between encapsulant and silicon chip.

TABLE 4

| Epoxy Resins Used | <Tg($10^{-5}$/°C.) | >Tg($10^{-5}$/°C.) |
|---|---|---|
| Control 1 (unmodified) | 2.0 | 7.3 |
| Control 2 (silicone blended) | 1.8 | 7.2 |
| Example 1 | 2.0 | 7.1 |
| Example 2 | 2.0 | 7.0 |
| Example 3 | 1.9 | 6.6 |
| Example 4 | 1.8 | 6.6 |
| Example 5 | 1.9 | 6.6 |
| Example 6 | 2.0 | 7.2 |
| Example 7 | 2.0 | 7.0 |
| Example 8 | 1.9 | 6.6 |
| Example 9 | 1.8 | 7.2 |
| Example 10 | 1.8 | 6.9 |

Table 5 shows the results of the flexural test. The flexural moduli of the cured encapsulants were reduced markedly no matter whether it is modified with silicone or urethane prepolymer. The flexural strengths of the present modified CNE were approximately equal to or slightly larger than that of the Control 1 unmodified epoxy resin; however, the flexural strength was significant reduced with the silicone powder modification (the Control 2 epoxy resin). These results indicate that physical blending, although improves the toughness of cured epoxy resin, lowers it's strength.

TABLE 5

| Epoxy Resins Used | Flexural Modulus (Kg$_f$/mm$^2$) | Flexural Strength (Kg$_f$/mm$^2$) |
|---|---|---|
| Control 1 (unmodified) | 1310 | 13.4 |
| Control 2 (silicone blended) | 1173 | 12.8 |
| Example 1 | 1206 | 13.2 |
| Example 2 | 1120 | 13.2 |
| Example 3 | 1107 | 14.1 |
| Example 4 | 1062 | 13.5 |
| Example 5 | 1139 | 14.1 |
| Example 6 | 1228 | 13.7 |
| Example 7 | 1132 | 13.3 |
| Example 8 | 1118 | 14.2 |
| Example 9 | 1016 | 13.9 |
| Example 10 | 1164 | 14.2 |

Table 6 shows the internal stress of the control and various rubber-modified encapsulants. The encapsulants prepared by using the present modified epoxy resins and the silicone elastomer modified epoxy resin (Control 2) all had a lower stress than that of the Control 1 unmodified epoxy resin.

TABLE 6

| Epoxy Resins Used | $\alpha_r * E_r$ internal Stress ($10^{-5} Kg_f/mm^2 °C.$) |
|---|---|
| Control 1 (unmodified) | 2620 |
| Control 2 (silicone blended) | 2111 |
| Example 1 | 2412 |
| Example 2 | 2240 |
| Example 3 | 2103 |
| Example 4 | 1911 |
| Example 5 | 2164 |
| Example 6 | 2456 |
| Example 7 | 2264 |
| Example 8 | 2124 |
| Example 9 | 1828 |
| Example 10 | 2095 |

Absorbed moisture in the package was found not only to plasticize the epoxy resin causing a lowering of the Tg and in turn affecting mechanical response but also to cause package cracking. This crack (so called popcorn phenomenon) is caused by evaporation and expansion of absorbed moisture in the package at the temperature of reflow soldering (215° C. to 260° C.) for mounting on printed circuits. The moisture absorption results are given in Table 7. Encapsulants prepared by using the Control 2, Examples 4 and 9 modified epoxy resins containing polysiloxane moiety absorbed the least moisture.

TABLE 7

| Epoxy Resins Used | Weight Gain (%) |
|---|---|
| Control 1 (unmodified) | 0.32 |
| Control 2 (silicone blended) | 0.28 |
| Example 1 | 0.42 |
| Example 2 | 0.35 |
| Example 3 | 0.38 |
| Example 4 | 0.28 |
| Example 5 | 0.34 |
| Example 6 | 0.48 |
| Example 7 | 0.35 |
| Example 8 | 0.37 |
| Example 9 | 0.29 |
| Example 10 | 0.33 |

The Examples 4 and 9 modified epoxy resins (containing S1810 polysiloxane moiety), and Examples 3 and 8 modified epoxy resins [containing polytetramethylene ether glycol (PTMG) moiety] which not only has a lower stress but also has a higher Tg than that of the Control 1 unmodified epoxy resin, moreover, S1810 absorbs the least moisture, were chosen to encapsulate the semiconductor devices. The encapsulated devices were subjected to a thermal shock cycling test in comparison with the control resin.

The thermal shock cycling test involves cycling the encapsulated devices at –65° and 150° C. and observing the crack (failure) of encapsulated devices at various intervals (after 250, 500, 750, 1000, 1500, 2000, 2500, 3000, 3500, 4000, and 4500 cycles). Any crack that occurred in a device is counted as failure for that device. The percentage of devices that failed vs. test cycles is given in Table 8. The results indicate that for 50% of the devices, failure happened after 3600 cycles for the S1810 modified EMC and after 2400 cycles for the PTMG modified CNE compared to after 750 cycles for the Control 1 unmodified epoxy resin.

TABLE 8

| Thermal Shock Cycles | Failure Ratio, % | | | | |
|---|---|---|---|---|---|
| | Control 1 | Example 3 | Example 8 | Example 4 | Example 9 |
| 750 | 50 | 25 | 23 | 10 | 11 |
| 1000 | 62 | 32 | 29 | 13 | 15 |
| 2000 | 80 | 43 | 42 | 30 | 34 |
| 2500 | 90 | 50 | 52 | 37 | 38 |
| 3000 | 100 | 65 | 65 | 43 | 42 |
| 3500 | 100 | 77 | 72 | 50 | 52 |

We claim:

1. An encapsulation composition for semiconductor devices comprising a modified epoxy resin having the following formula I:

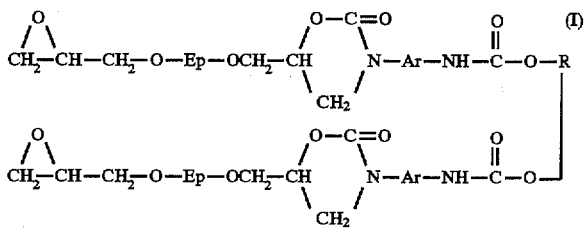

Wherein R is

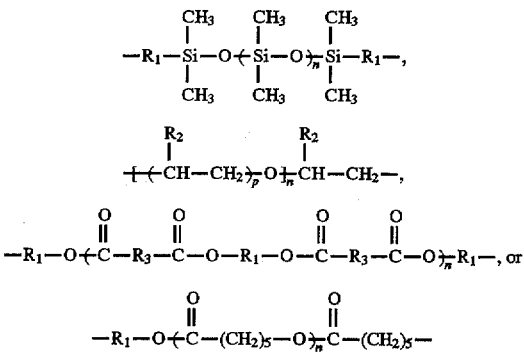

wherein $R_1$ is —$(CH_2)_m$—, m is an integer of 1–10;

$R_2$ is hydrogen or methyl;

$R_3$ is —$(CH_2)_q$—, q is an integer of 4–12;

n is an integer of 5–1,000, and p is an integer of 1–3; Ar is phenylene, tolylene, naphthylene,

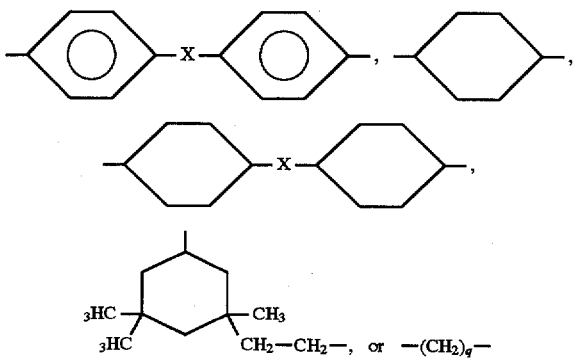

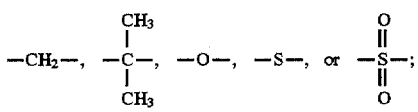

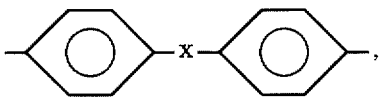

or a phenol-aldehyde novolac epoxy resin backbone having the following formula:

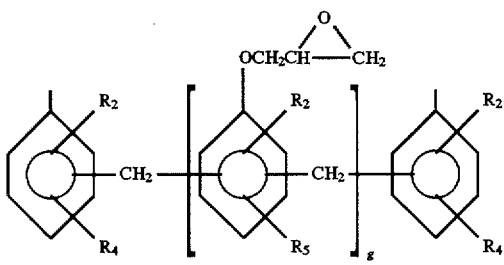

wherein X and $R_2$ are the same as defined above, g is an integer of 1–6, $R_4$ and $R_5$ independently are hydrogen or

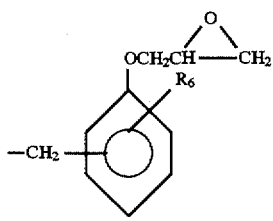

wherein $R_6$ is hydrogen or methyl.

2. The encapsulation composition according to claim 1, wherein R of the modified epoxy resin I is

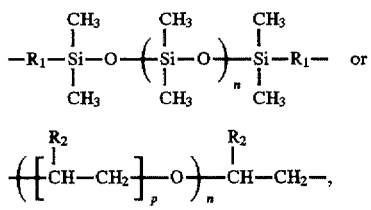

wherein n is an integer of 10–200, $R_2$ is hydrogen and p is 2.

3. The encapsulation composition according claim 1, wherein Ar of the modified epoxy resin I is tolylene or

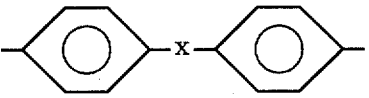

wherein X is —$CH_2$—.

4. The encapsulation composition according claim 1, wherein Ep of the modified epoxy resin I is a phenol-aldehyde novolac epoxy resin backbone having the following formula:

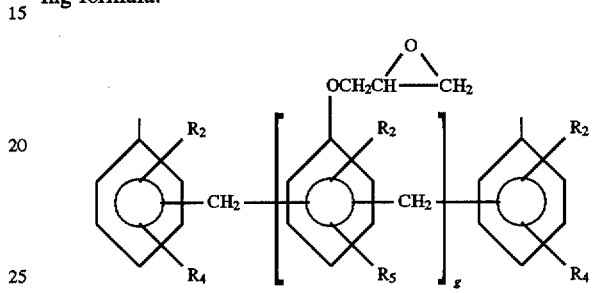

wherein $R_2$ is methyl, $R_4$ is hydrogen, g is an integer of 1–6, and $R_5$ is hydrogen or

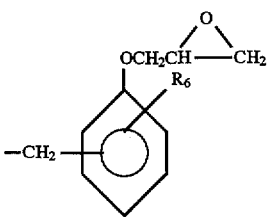

wherein $R_6$ is methyl.

5. The encapsulation composition according to claim 2, wherein R of the modified epoxy resin I is

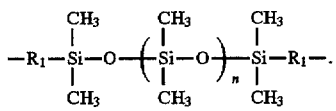

* * * * *

UNITED STATES PATENT AND TRADEMARK OFFICE
CERTIFICATE OF CORRECTION

PATENT NO. : 5,686,541

DATED : November 11, 1997

INVENTOR(S) : Wang et al.

Page 1 of 2

It is certified that error appears in the above-indentified patent and that said Letters Patent is hereby corrected as shown below:

Col. 2, line 13 "Matsumoio" should be --Matsumoto--;
Col. 2, line 44 please delete the "5" before developing;
Col. 3, line 55 please insert --wherein X is-- before the Figure;
Col. 3, line 55 please insert --and-- after the Figure;
Col. 3, line 59 please add -- q is an integer of 4-12; and--;
Col. 3, line 60 please insert --EP is-- before the Figure;
Col. 5, line 60 "-$R_1$" should be -- -$R_1$-0--;
Col. 6, line 20 "or -$(CH_2)_2$-" should be --or -$(CH_2)_q$- --;
Col. 6, line 29 please insert --wherein X is-- before the Figure;
Col. 6, line 29 ";" should be --; and--;
Col. 6, line 45 please insert --EP is-- before the Figure;
Col. 6, line 44 after Fig. insert -- q is a integer 4-12; and --.

Col. 7, line 58 "HP" should be --HO--;
Col. 8, line 8 "(HBMDI)" should be --(H8MDI)--;
Col. 8, line 41 "mm" should be --2mm--;
Col. 9, line 1 "5°C." should be --85°C.--;
Col. 9, line 10 "650°C." should be --65°C.--;
Col. 9, line 54 "With" should be --with--;
Col. 9, line 58 "kB;/$cm^2$" should be --kg/$cm^2$--;

UNITED STATES PATENT AND TRADEMARK OFFICE
CERTIFICATE OF CORRECTION

PATENT NO. : 5,686,541
DATED : November 11, 1997
INVENTOR(S) : Wang et al.

Page 2 of 2

It is certified that error appears in the above-identified patent and that said Letters Patent is hereby corrected as shown below:

Col. 15, line 1 please insert --wherein X is-- before the Figure;
Col. 15, line 1 ";" should be --; and-- ; and
Col. 15, line 10 please insert --EP is-- before the Figure.
Col. 15, line 9 after Fig. insert -- q is an integer 4-12; and --.

Signed and Sealed this

Twenty-seventh Day of January, 1998

Attest:

BRUCE LEHMAN

Attesting Officer

Commissioner of Patents and Trademarks